(12) United States Patent
Suzuki et al.

(10) Patent No.: US 7,768,421 B2
(45) Date of Patent: Aug. 3, 2010

(54) CONTROL SIGNAL RECEIVING APPARATUS

(75) Inventors: Hidekazu Suzuki, Osaka (JP); Yutaka Nio, Osaka (JP); Masazumi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 1042 days.

(21) Appl. No.: 10/584,619

(22) PCT Filed: Dec. 27, 2004

(86) PCT No.: PCT/JP2004/019509

§ 371 (c)(1),
(2), (4) Date: Jun. 26, 2006

(87) PCT Pub. No.: WO2005/064982

PCT Pub. Date: Jul. 14, 2005

(65) Prior Publication Data

US 2007/0165997 A1    Jul. 19, 2007

(30) Foreign Application Priority Data

Dec. 26, 2003   (JP) .............................. 2003-434074

(51) Int. Cl.
  *G08C 19/00*   (2006.01)
(52) U.S. Cl. .................. 340/825.72; 348/734; 340/825; 340/825.69; 386/46; 398/165
(58) Field of Classification Search ............... 340/825.5, 340/825.4, 825.69, 825.72, 825
See application file for complete search history.

(56) References Cited

U.S. PATENT DOCUMENTS

| 4,751,581 | A |   | 6/1988 | Ishiguro et al. |
|---|---|---|---|---|
| 5,579,469 | A | * | 11/1996 | Pike ........................... 715/781 |
| 6,529,138 | B2 | * | 3/2003 | Satoh .................... 340/825.72 |

FOREIGN PATENT DOCUMENTS

| JP | 62-115992 |   | 5/1987 |
|---|---|---|---|
| JP | 2-81598 |   | 3/1990 |
| JP | 2003-179985 |   | 6/2003 |
| JP | 2003179985 | A * | 6/2003 |
| JP | 2003-219486 |   | 7/2003 |
| KR | 1997-0070833 |   | 11/1997 |

* cited by examiner

*Primary Examiner*—Benjamin C Lee
*Assistant Examiner*—Cal Eustaquio
(74) *Attorney, Agent, or Firm*—Wenderoth, Lind & Ponack, L.L.P.

(57) ABSTRACT

When the HPD (104*b*) which indicated that the transmission of a control signal between the data receiving apparatus (102) and the control signal receiving apparatus (101) has become possible is detected, the command judging section (115) ignores the first reception command which it directly received from the remote controller (103) and makes the second reception command (112*a*) effective which it receives via the CEC line (104*a*).

In such a construction, it is possible to conduct a remote control operation normally without affecting unfavorable influences on the apparatuses.

4 Claims, 11 Drawing Sheets

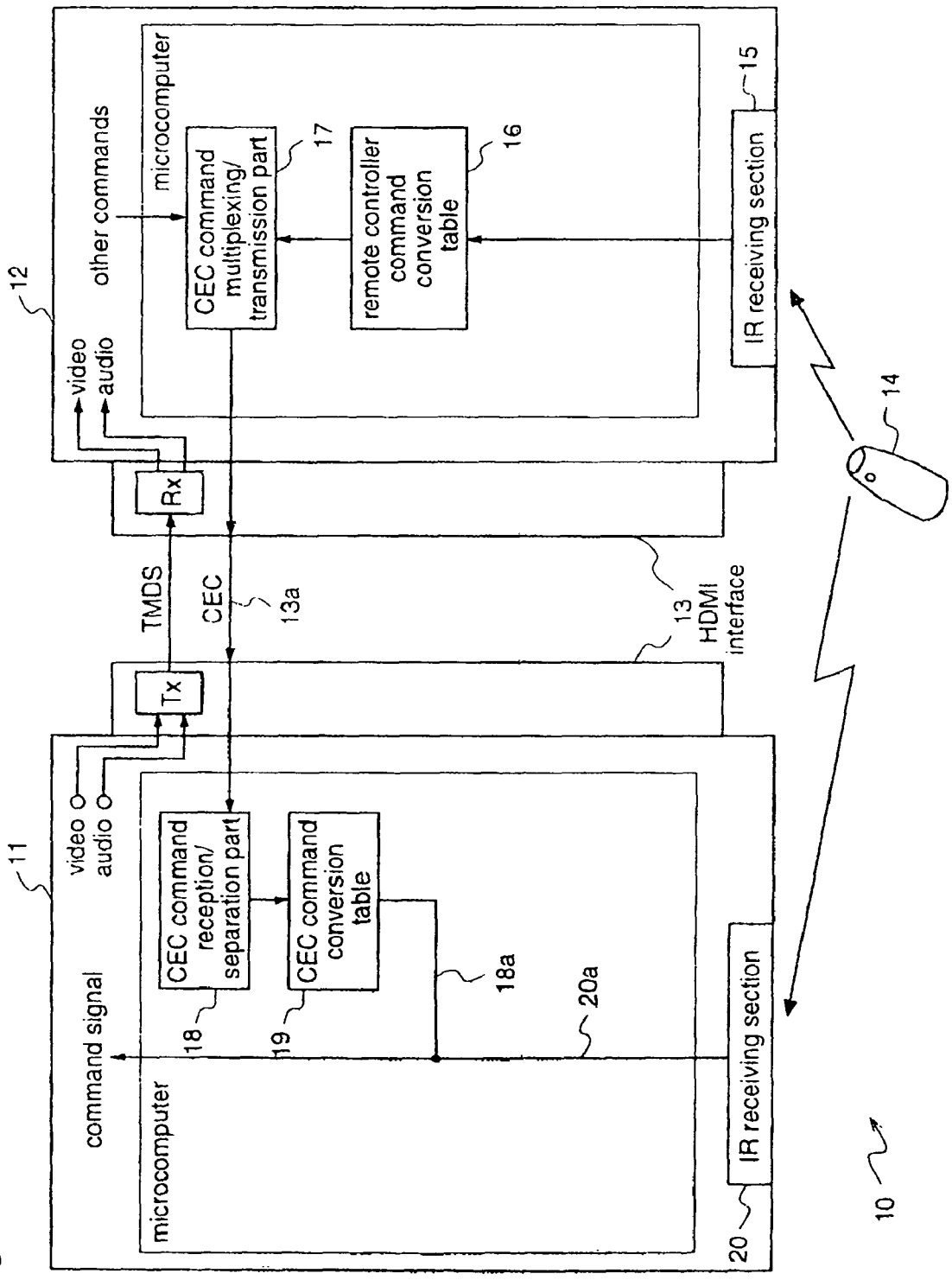

CONTROL SIGNAL RECEIVING APPARATUS

TECHNICAL FIELD

The present invention relates to a control signal receiving apparatus, and more particularly, to a control signal receiving apparatus which can receive a control signal for controlling a control signal receiving apparatus, which is prepared by a remote control unit which is attached to the control signal receiving apparatus, through a data receiving apparatus connected to the control signal receiving apparatus.

BACKGROUND ART

Recently, accompanying with fulfillment of standards or devices of a wire or wireless LAN (local area network), a network AV transmission system which is constituted by an AV (Audio Video) transmitter which transmits images of television or video with digitally compressing the images and an AV receiver which can receive that in another room in home is proposed (Patent Reference No. 1).

FIG. 11 shows a prior art network AV transmission system 10 using wires.

In the figure, the DVD apparatus 11 transmitting AV (Audio Video) and the video signal receiving apparatus 12 receiving AV are connected via HDMI (High-Definition Multimedia Interface) 13 which is an interface which has extended the DVI (Digital Visual Interface) 13 as a display connection technique which is constructed on a TMDS (Transmission Minimized Differential Signaling) basis which is a digital video transmission technique in its specifications oriented to home appliances, and there are CEC (Consumer Electronics Control) lines 13a which conduct a control of the apparatuses connected. Further, a remote controller 14 is affixed to the DVD apparatus 11.

Further, in the figure, the video signal receiving apparatus 12 also functions as a receiver for receiving a remote control signal which is transmitted from the remote controller 14 for the DVD apparatus 11, and the control code (remote control signal) which is transmitted from the remote controller 14 to the video audio receiving apparatus 12 is converted into a signal that can be transmitted with keeping its code form by the remote control command conversion table 16 and the CEC command multiplexing/transmission part 17, and is transmitted to the DVD apparatus 11 via the CEC line 13a. Then, the control signal which corresponds to the control code which is transmitted through the CEC line 13a is received by the DVD apparatus 11 and the DVD apparatus 11 is controlled by the control signal which is inputted through the CEC command receiving/separation part 18 and the CEC command conversion table, and video data and audio data are transmitted to the video audio receiving apparatus 12 through the communication path in accordance with the control signal. In other words, by utilizing the CEC line 13a, the DVD apparatus 11 can be operated through the video audio receiving apparatus 12 using the remote controller (remote control unit) 14 for the DVD apparatus.

In this way, if the remote control signal is transmitted to the video audio receiving apparatus 12 from the remote controller 14 which is attached to the DVD apparatus 11, it is possible to control the DVD apparatus 11 through the video audio receiving apparatus 12. In other words, the DVD apparatus can be operated as a control signal receiving apparatus which receives the control signal from the remote controller 14 and/or the control signal from the video audio receiving apparatus 12, and transmits the data to the video audio receiving apparatus 12 as a data receiving apparatus on the basis of the received control signal.

(Patent Reference No. 1) Japanese Published Patent Application No. 2003-219486

DISCLOSURE OF THE INVENTION

Problems to be Solved by the Invention

However, if the video audio receiving apparatus 12 and the DVD apparatus 11 are arranged close to each other, even if the remote controller 14 for the DVD apparatus is intended to be operated toward the remote controller receiving part 15 of the video audio receiving apparatus 12, the control signal would be received also by the remote controller receiving part 20 of the DVD apparatus 12. Accordingly, if a operation command such as a power supply button is adopted, the same command is inputted to the DVD apparatus 11 via two paths of a reception from the remote controller receiving part 20 of the DVD apparatus 11 (hereinafter, referred to as a first reception command 20a) and a reception via the CEC line 13a from the video audio receiving apparatus 12 (hereinafter, referred to as a second reception command 18a), and thereby generating chattering repeating such as ON/OFF of power supply. Further, even in the UP/DOWN operation of channels, there is a problem in that one button operation causes an UP or DOWN operation by plural channels.

In order to prevent generation of such chattering, when the first reception command 20a and the second reception command 18a are received close to each other, it is necessary to select either of them and ignore the other receiving command.

Further, when the first reception command 20a and the second reception command 18a are received by the DVD apparatus 11 as the same command, it is normally thought that the first reception command 20a which is directly received from the remote controller 14 is received first and the second reception command 18a which passes through the video audio receiving apparatus 12 and the CEC line is received later.

However, in the second reception command 18a which passes through the video audio receiving apparatus 12 and the CEC line, there may be a possibility that the other control signal other than the remote control command is related in the transmission path. Therefore, if the first reception command 20a which is first received is selected, and the second reception command 18a which is received later is ignored, it may be a possibility that unfavorable influences are affected on the apparatuses and a malfunction would occur. For example, the following examples are thought of.

It is supposed that in a case where the DVD apparatus 11 is a DVD apparatus including an HDD, for example, an HDD-REC command is transmitted toward the HDD (in a state where there is no vacant capacity) in the power on state.

In this case, when first of all, the first reception command 20a which is transmitted toward the DVI apparatus 11 is selected, and the second reception command 18a is ignored, it is tried to conduct recording in the HDD by the first reception command, but since there is no vacant capacity, the REC is halted and the processing is concluded.

On the other hand, if the second reception command 18a is selected and the first reception command 20a is ignored, a HDD-REC command is transmitted to the HDD including DVD apparatus 11 from the video audio receiving apparatus 12 by the second reception command 18a. Then, it is possible to confirm the REC off status via the CEC line 13a, and to transmit the DVD-REC command with being related with the HDD-REC command. Thereby, when the second reception command 18a is made effective, the video audio receiving apparatus can acknowledge that after first of all transmitting the REC command to the HDD, the command is not accepted because there is no vacant space in HDD (REC is halted and the processing is concluded) via the CEC line 13a, and thereafter, it can transmit the REC command to the recording medium (DVD) which is mounted on the DVD apparatus. Then, if there is a vacant capacity in the DVD, recording operation is carried out. Thereby, it is possible to prevent failure in recording. Further, when there is no vacant capacity in DVD, it is possible to conduct an OSD display presenting incapability of REC (recording).

In this way, there was a problem in that if the second reception command 18a is incautiously ignored, there may be unfavorable influences affected on the apparatuses, thereby resulting in a malfunction. Further, the control timing may become too complicated to enable ignoring the second reception command 18a, resulting in requiring a complicated circuit construction.

The present invention is directed to solving the above-described problems and has for its object to provide a control signal receiving apparatus which can carry out a remote control operation normally without unfavorable influences being affected on the apparatuses, which a control signal receiving apparatus can receive the control signal generated by a remote control unit which is affixed to the control signal receiving apparatus via the data receiving apparatus which is connected to the control signal receiving apparatus.

Measures to Solve the Problems

In order to solve the above problems, according to aspect 1 of the present invention, there is provided a control signal receiving apparatus which can receive a control signal from the remote control unit which is attached to the control signal receiving apparatus via a data receiving apparatus which is connected to the control signal receiving apparatus, which comprises a command judging section which receives a first reception command which is directly received from the remote control unit and a second reception command which is received via the data receiving apparatus as its inputs and outputs selectively either command with judging one which is to serve as effective.

According to aspect 2 of the present invention, there is provided a control signal receiving apparatus as defined in aspect 1, wherein the command judging section makes the second reception command which is received by the apparatus later effective when the first reception command and the second reception command are received by the apparatus temporary close to each other.

According to aspect 3 of the present invention, there is provided a control signal receiving apparatus as defined in aspect 2 wherein there is provided a connection signal detection section which detects a connection signal which indicates that the transmission of the control signal between the data receiving apparatus and the control signal receiving apparatus is possible, and the command judging section makes the second command which is inputted to the command judging section pass through as it is with ignoring the first reception command which is inputted to the command judging section, when it receives the connection signal which is outputted from the connection signal detection section.

According to aspect 4 of the present invention, there is provided a control signal receiving apparatus as defined in aspect 2, wherein the command judging section cancels the ignoring of the first reception command to make the first reception command effective, when no second reception command is inputted even after a predetermined time has passed after the first reception command was ignored.

According to aspect 5 of the present invention, there is provided a control signal receiving apparatus as defined in aspect 2, wherein there is provided a delaying section which delays the first reception command so that the second reception command and the first reception command are inputted to the command judging section in this order, and the command judging section makes the second reception command which is inputted to the command judging section prior to the first reception command pass through as it is, and ignores the first reception command which is inputted to the command judging section later than the second reception command with being delayed by the delaying section.

According to aspect 6 of the present invention, there is provided a control signal receiving apparatus as defined in aspect 5, wherein the command judging section makes the first reception command which is inputted via the delaying section pass through as it is, when the second reception command is not inputted.

According to aspect 7 of the present invention, there is provided a control signal receiving apparatus as defined in aspect 2, wherein there are provided a connection signal detection section which detects a connection signal indicating that transmission between the control signal receiving apparatus and the data receiving apparatus is possible, and a delaying section which delays the first reception command so that the second reception command and the first reception command are inputted in this order to the command judging section, and the command judging section makes the first reception command inputted thereto without passing through the delaying section and makes the inputted first reception command pass through as it is, when the connection signal is not detected by the connection signal detection section, and makes the second reception command which is inputted thereto prior to the first reception command, pass through as it is, and ignores the first reception command which is delayed by the delaying section to be inputted thereto later than the second reception command, when the connection signal is detected by the connection signal detecting section.

According to aspect 8 of the present invention, there is provided a control signal receiving apparatus as defined in aspect 7, wherein the command judging section makes the first reception command which is inputted via the delaying section pass through as it is, when the connection signal is detected by the connection signal detecting section and no second reception signal is inputted thereto.

According to aspect 9 of the present invention, there is provided a control signal receiving apparatus as defined in any of aspect 5 to 8, wherein the delay amount of the first reception command which is delayed by the delaying section is larger than the time difference between the time when the first reception command is inputted to the command judging section without passing through the delaying section and the time when the second reception command is inputted to the command judging section, and is smaller than the shortest time from the time when the first reception command is inputted thereto to the time when the next command is inputted thereto.

According to aspect 10 of the present invention, there is provided a control signal receiving apparatus as defined in aspect 1, wherein there is provided a command comparing section which receives the first reception command and the second reception command which are received temporary close to each other as its inputs, and compares whether the first reception command and the second reception command coincide with each other, and the command judging section makes the second reception command as effective and ignores the first reception command, when the first reception command and the second reception command are judged as coinciding with each other by the command comparing section, and the command judging section makes the both reception commands as effective and first outputs the first reception command and subsequently outputs the second reception command, when the first reception command and the second reception command do not coincide with each other.

EFFECTS OF THE INVENTION

As described above, according to a control signal receiving apparatus of aspect 1 of the present invention, since a control signal receiving apparatus which can receive a control signal from the remote control unit which is attached to the control signal receiving apparatus via a data receiving apparatus which is connected to the control signal receiving apparatus, includes a command judging section which receives a first reception command which is directly received from the remote control unit and a second reception command which is received via the data receiving apparatus as its inputs and outputs selectively either command with judging one which is to serve as effective, even when the control signals are received by both of the control signal receiving apparatus and the data receiving apparatus, a normal command outputting is possible and a normal remote control operation can be carried out.

According to aspect 2 of the present invention, since in the control signal receiving apparatus of aspect 1 the command judging section makes the second reception command which is received by the apparatus later when the first reception command and the second reception command are received by the apparatus temporary close to each other, it is possible to carry out command judgment which would not generate unfavorable influences on the apparatuses due to that the second reception command which goes through paths through which the control signals of apparatuses are transmitted is ignored.

According to aspect 3 of the present invention, since in the control signal receiving apparatus of aspect 2 there is provided a connection signal detection section which detects a connection signal which indicates that the transmission of the control signal between the data receiving apparatus and the control signal receiving apparatus is possible, and the command judging section makes the second reception command which is inputted to the command judging section pass through as it is with ignoring the first reception command which is inputted to the command judging section, when it receives the connection signal which is outputted from the connection signal detection section, it is possible to provide a control signal receiving apparatus which can carry out a normal remote control operation without generating unfavorable influences on the apparatuses due to that the second reception command which goes through paths through which the control signals of apparatuses are transmitted is ignored.

According to aspect 4 of the present invention, since in the control signal receiving apparatus of aspect 3 the command judging section cancels the ignoring of the first reception command to make the first reception command effective, when no second reception command is inputted even after a predetermined time has passed after the first reception command was ignored, it is possible to output the first reception command, even when the reception of the reception command is only that of the first reception command.

According to aspect 5 of the present invention, since in the control signal receiving apparatus of aspect 2 there is provided a delay section which delays the first command so that the second command and the first command are inputted to the command judging section in this order, and the command judging section makes the second reception command which is inputted to the command judging section prior to the first reception command pass through as it is, and ignores the first reception command which is inputted to the command judging section later than the second reception command with being delayed by the delaying section, it is possible to provide a control signal receiving apparatus which can carry out a normal remote control operation without generating unfavorable influences on the apparatuses due to that the second reception command which goes through paths through which the control signals of apparatuses are transmitted is ignored.

According to aspect 6 of the present invention, since in the control signal receiving apparatus of aspect 5 the command judging section makes the first reception command which is inputted via the delaying section pass through as it is, when the second reception command is not inputted, it is possible to output the first reception command, even when the reception of the reception command is only that of the first reception command.

According to aspect 7 of the present invention, since in the control signal receiving apparatus of aspect 2 there is provided a connection signal detection section which detects a connection signal indicating that transmission between the control signal receiving apparatus and the data receiving apparatus is possible, and a delaying section which delays the first reception command so that the second reception command and the first reception command are inputted in this order to the command judging section, and the command judging section makes the first reception command inputted thereto without passing through the delaying section and makes the inputted first reception command pass through as it is, when the connection signal is not detected by the connection signal detection section, and makes the second reception command which is inputted to the command judging section prior to the first reception command, pass through as it is, and ignores the first reception command which is delayed by the delaying section to be inputted thereto later than the second reception command, when the connection signal is detected by the connection signal detecting section, it is possible to provide a control signal receiving apparatus which can carry out a normal remote control operation without generating unfavorable influences on the apparatuses due to that the second reception command which goes through paths through which the control signals of apparatuses are transmitted is ignored.

Further, it is possible to carry out a remote control operation without any delay when it is not connected to the data receiving apparatus.

According to aspect 8 of the present invention, since in the control signal receiving apparatus of aspect 7 the command judging section makes the first reception command which is inputted via the delaying section pass through as it is, when the connection signal is detected by the connection signal detecting section and no second reception signal is inputted thereto, it is possible to output the first reception command, even when the reception of the reception command is only that of the first reception command.

According to aspect 9 of the present invention, since in the control signal receiving apparatus of any of aspect 5 to 8 the delay amount of the first reception command which is delayed by the delaying section is larger than the time difference between the time when the first reception command is inputted to the command judging section without passing through the delaying section and the time when the second reception command is inputted to the command judging section, and is smaller than the shortest time from the time when the first reception command is inputted thereto to the time when the next command is inputted thereto, it is possible to carry out a normal remote control operation without ignoring the second reception command.

According to aspect 10 of the present invention, since in the control signal receiving apparatus of aspect 1 there is provided a command comparing section which receives the first reception command and the second reception command which are received temporary close to each other as its inputs, and compares whether the first reception command and the second reception command coincide with each other, and the command judging section makes the second reception command as effective and ignores the first reception command, when the first reception command and the second reception command are judged as coinciding with each other by the command comparing section, and the command judging section makes the both reception commands as effective and first outputs the first reception command and subsequently outputs the second reception command, when the first reception command and the second reception command do not coincide with each other, it is possible to carry out command outputting in the order of reception, even when the first command and the second command which are different commands are received temporary close to each other.

BRIEF DESCRIPTION OF THE DRAWINGS

FIG. 11 is a schematic diagram illustrating a network AV transmission system which can transmit a control signal to a control signal receiving apparatus via a data receiving apparatus.

Figure 1:
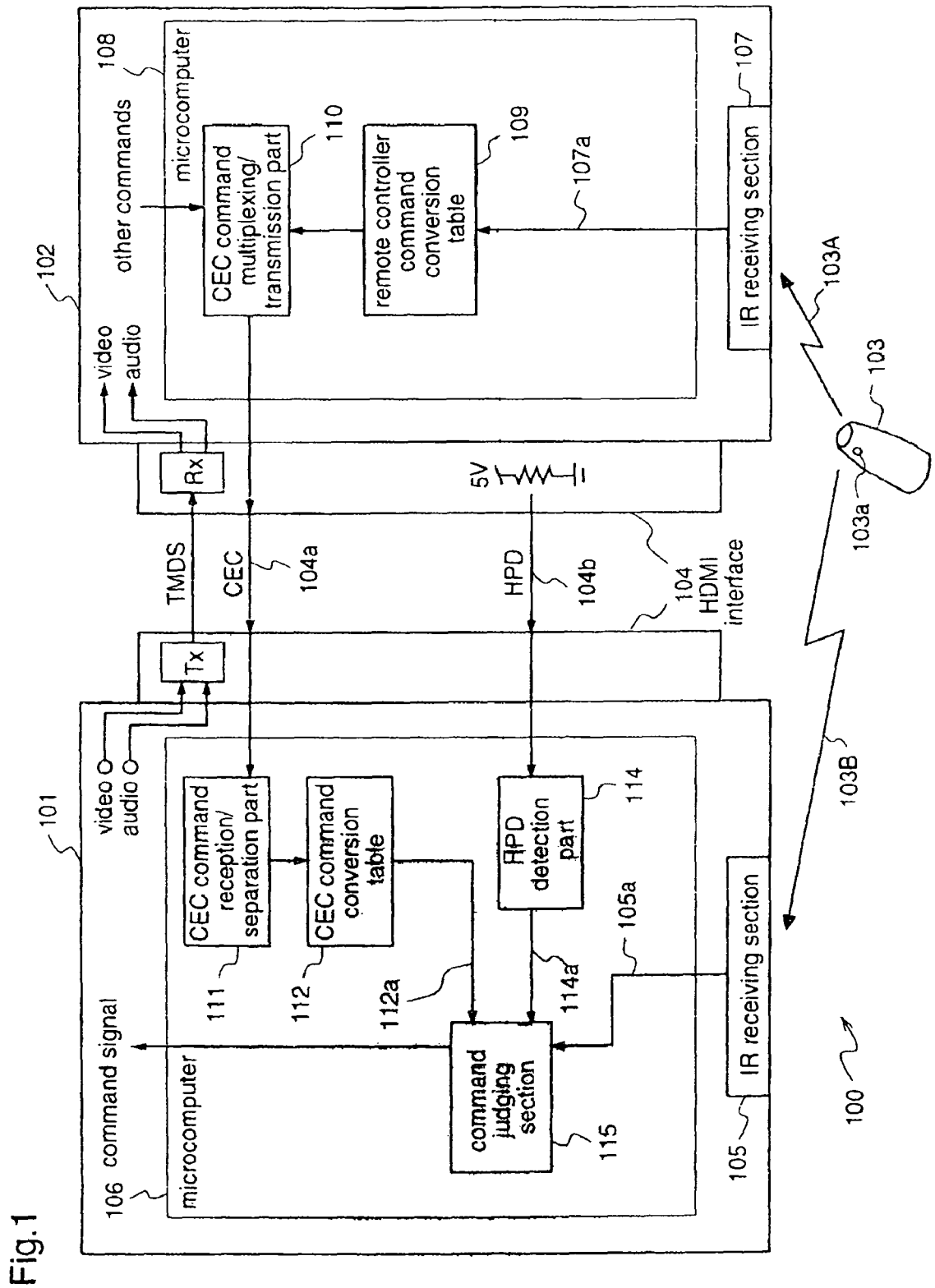
FIG. 1 is a diagram illustrating a network AV transmission system utilizing the control signal receiving apparatus according to a first embodiment of the present invention.

DESCRIPTION OF REFERENCE NUMERALS 100, 300, 500, 700 network AV transmission system
101, 301, 501, 701 DVD apparatus (control signal receiving apparatus)
102 video audio receiving apparatus (data receiving apparatus)
103, 303, 503, 703 DVD remote controller
103a, 303a, 503a, 703a power supply button
103A, 303A, 503A, 703A remote control signal against the video audio receiving apparatus
103B, 303B, 503B, 703B remote control signal against the DVD apparatus
104 HDMI interface
104a CEC line
104b HPD
105, 305, 505, 705 DVD IR receiving section
105a, 305a, 505a, 705a first reception command
106, 306, 506, 706 microcomputer for DVD apparatus
107 an IR receiving section of a video audio receiving apparatus
107a control signal
108 microcomputer for a video audio receiving apparatus
109 remote controller command conversion table
110 CEC command multiplexing/transmission part
111, 311, 511, 711 CEC command reception/separation part
112, 312, 512, 712 CEC command conversion table
112a, 312a, 512a, 712a second reception command
114, 314, 514, 714 HPD detection part
114a, 514a, HPD detection signal
115, 315, 515, 715 command judging section
316, 516 delaying part
517, 717 switching part
714a output signal of the HDP detection part
716 first delaying part
718 second delaying part
719 command comparator
719a a output signal from command comparator
710 AND circuit
720a output signal from AND circuit
10 network AV system
11 DVD apparatus
12 video audio receiving apparatus
13 HDMI interface
13a CEC line
14 remote controller
15, 20 remote controller IR receiving section
16 remote controller command conversion table
17 CEC command multiplexing/transmission part
18 CEC command reception/separation part
18a second reception command
19 CEC command conversion table
20a first reception command

BEST MODE FOR EMBODYING THE INVENTION

Embodiment 1

Hereinafter, a control signal receiving apparatus according to a first embodiment of the present invention will be described with referring to FIGS. 1, 2, and 3.

FIG. 1 is a diagram illustrating a network AV transmission system 100 utilizing the control signal receiving apparatus according to a first embodiment of the present invention.

In the figure, numeral 101 denotes a DVD apparatus as a control signal receiving apparatus according to a first embodiment of the present invention. Numeral 102 denotes a video audio receiving apparatus as a data receiving apparatus which receives the video audio signal from the DVD apparatus 1. Numeral 103 denotes a DVD remote controller (remote control unit) which transmits a command by an infrared (control signal), IR, so as to operate the DVD apparatus 101, being attached to the DVD apparatus 101.

In this first embodiment, the DVD apparatus 101 and the video audio receiving apparatus 102 are connected to each other via HDMI (High-Definition Multimedia Interface) 104 that is obtained by having extended the DVI (Digital Visual Interface) as a display connection technique constructed on TMDS (Transition Minimized Differential Signaling) basis as a digital video transmission technique in its specifications toward the home appliances applications, and there is provided a CEC (Consumer Electronics Control) line 104a for carrying out a control of apparatuses connected. Therefore, by utilizing this, it is possible to transfer a remote control command (carry out a command pass through) to the DVD apparatus when operating the DVD remote controller 103 toward the video audio receiving apparatus 102.

The DVD apparatus 101 includes the IR receiving section 105 which receives the command from the DVD remote controller 103 and a microcomputer 106 for controlling the whole apparatus, and the video audio receiving apparatus 102 includes an IR receiving section 107 which can receive the command form the DVD remote controller 103 and the microcomputer 108 for controlling the whole apparatus. The first microcomputer 108 of the video audio receiving apparatus 102 includes the remote controller command conversion table 109 for converting the command received from the DVD remote controller 103 to a CEC command so as to transmit through the CEC line 104a, and a CEC command multiplexing/transmission part 110 which multiplexes the CEC command which is obtained by conversion using the remote controller command conversion table 109 and other control commands to transmit the result to the DVD apparatus 101.

On the other hand, the microcomputer 106 of the DVD apparatus 101 includes the CEC command reception/separation part 111 which receives the command which is transferred via the CEC line from the video audio receiving apparatus 102 and separates the CEC command, the CEC command conversion table 112 for converting the CEC command to a remote control command, an HPD detection part 114 for detecting the HPD (Hot Plug Detect) 104b indicating that the transmission of the control signal between the video audio receiving apparatus 102 and the DVD apparatus 101 has become possible, i.e., indicating that the transmission of the control signal is possible by its High state, and a command judging section 115 which receives the command (hereinafter referred to as a first reception command) 105a which is directly received from the DVD remote controller 103 by the IR receiving section 105 and the command (hereinafter referred to as a second reception command) 112a which is received via the video audio receiving apparatus 102 and the CEC line 104a at its inputs, and judges a command which is to be made as effective to selectively output the command.

The command judging section 115 ignores the first reception command 105a which is inputted to the command judging section 115 when it receives the HPD detection signal 114a from the HPD detection part 114, and passes the second reception command 112a which is inputted to the command judging section 115 as it is.

Next, the command judging operation which is conducted in the network AV transmission system 100 utilizing the control signal receiving apparatus according to the first embodiment of the present invention will be described with reference to FIGS. 1, 2, and 3.

Figure 2:
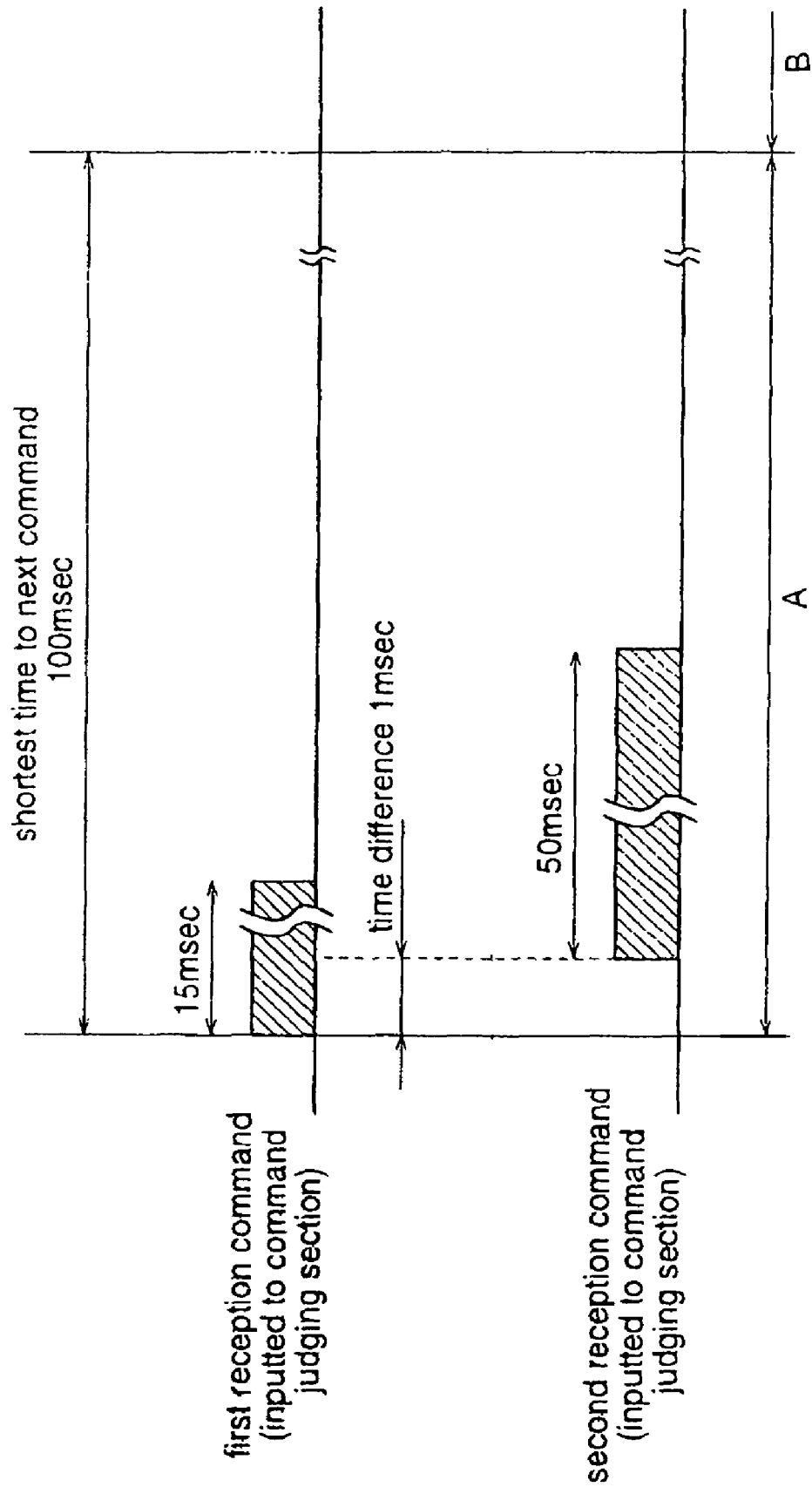
FIG. 2 is a time chart illustrating setting and canceling of ignoring for the first reception command in the command judging section in the control signal receiving apparatus of the first embodiment of the present invention.

FIG. 2 shows an example of a time chart illustrating setting and canceling of ignoring for the first reception command in the command judging section 115 in the control signal receiving apparatus according to the first embodiment of the present invention.

In the figure, the first reception command 105a is made as requiring a communication time of about 15 msec, while the second reception command 112a is made as requiring a communication time of about 50 msec since it is transmitted with being related to other apparatus control commands. Further, it is set that the time difference between the time when the second reception command 112a is inputted and the time when the first reception command 105a is inputted is within 1 msec in the command judging section 115.

For example, assuming that the shortest time from the time when the first reception command 105a is inputted to the time when the next command is inputted is 100 msec in the command judging section 115, if the HPD has been detected, the first reception command 105a that is inputted to the command judging section 115 within the period A is ignored. Then, if the command judging section 115 is in a state where it received the first reception command 105a and did not receive the second reception command 112a at its input within the period B, it cancels the ignoring for the first reception command 105a to output the first reception command 105a.

Figure 3:
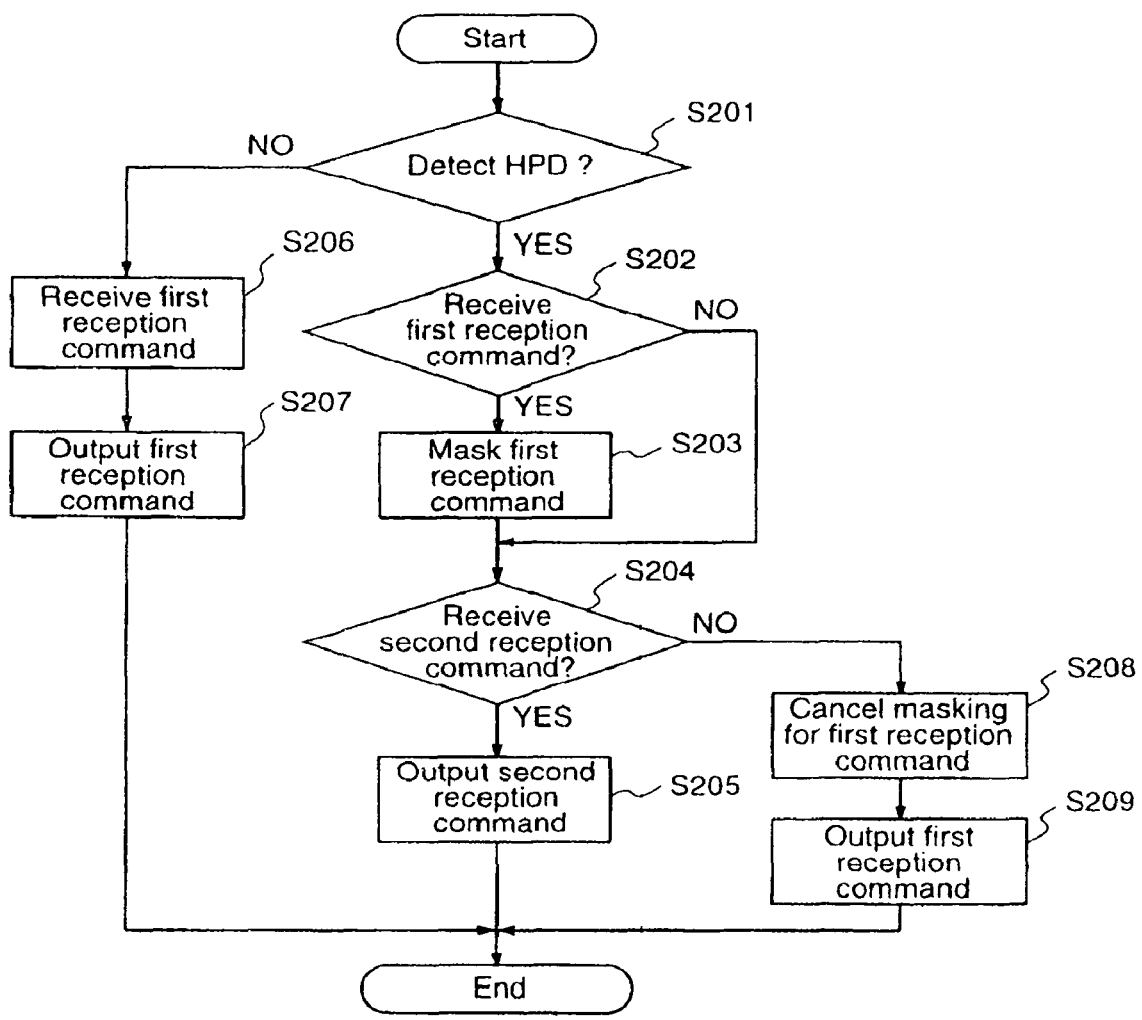
FIG. 3 is a flowchart illustrating a command judging operation in the control signal receiving apparatus of the first embodiment of the present invention.

FIG. 3 is a flowchart illustrating a command judging operation in the control signal receiving apparatus of the first embodiment of the present invention.

First of all, when the DVD apparatus 101 and the video audio receiving apparatus 102 are mechanically connected to each other, and the main power supply of the both apparatuses are turned on, an HPD signal 104b indicating that the transmission of a control signal between the both apparatuses has been made possible is outputted and the HDP signal 104b is detected by the HDP signal detection part 114 (Step S201). Next, when an operator holds the DVD remote controller 103 which is attached to the DVD apparatus 101, for example, directed toward the video audio receiving apparatus 102 and pushes its power supply button 103a, a remote control signal 103A is emitted toward the video audio receiving apparatus 102 and further the remote control signal 103A is received by the IR receiving section 107 of the video audio receiving apparatus 102. Further, a resulting control signal 107a is outputted via the remote control command conversion table 109, the CEC command multiplexing/transmission part 110, and through the CEC line 104a from the video audio receiving apparatus 102, and is received by the DVD apparatus 101, and further it passes through the CEC command receiving/separation part 111, the CEC command conversion table 112 to be converted to the second reception command 112a, to be inputted to the command judging section 115. In the DVD remote controller 103, since an infrared is used for the remote control signal, the remote control signal 103B which is the same command as the remote control signal 103A is also emitted toward the DVD apparatus 101. Then, the remote control signal 103B is first received by the IR receiving section 105 of the DVD apparatus 101, and the first reception command 105a is inputted to the command judging section 115.

The command judging section 115 ignores the inputted first reception command 105a (Step S203) upon receiving the detection signal 114a from the HPD detection part 114, when the HPD is detected at step S201 and the first reception command 105a is received (Step S202) as described above.

Then, when the second reception command 112a is received (Step S204) as described above, the command judging section 115 makes the inputted second reception command 112a pass through as it is, and outputs the second reception command 112a (Step S205).

On the other hand, when, for example, the remote control signal 103B is not received by the DVD apparatus 101 due to the presence of such as obstructions at operating the DVD remote controller 103 in the above step S202, the DVD apparatus 101 only receives the second reception command (Step S204), and the command judging section 115 makes the inputted second reception command 112a pass through as it is, and outputs the second reception command 112a (Step S205).

Further, when, for example, the remote control signal 103A is not received by the DVD apparatus 101 due to the presence such as obstructions at operating the DVD remote controller 103 in the above step S202, the DVD apparatus 101 receives only the first reception command, and the command judging section 115 cancels the ignoring for the first reception command (Step S208) when no second reception command is received even when a predetermined time has passed at step S204 after ignoring the first reception command at step S203, and outputs the first reception command (Step S209).

Here, the predetermined time from the time when the first reception command is ignored up to the time when the ignoring of the first reception command is canceled, is preferred to be made the longest time difference between the time when the first reception command is inputted to the command judging section and the time when the second reception command is inputted to the command judging section. Particularly, the ignoring of the first reception command may be canceled during the time period of B, when no second reception command is inputted even when the time period A which is the longest time difference as described above has passed after the first reception command being ignored.

Further, when, for example, the HPD detection signal 104b is not detected by a simple DVD apparatus, or the DVD apparatus 101 together with another display apparatus having no HDMI interface at step S201, the second reception commend 112a will not be received by the DVD apparatus 101. Therefore, the command judging section 115 makes, when it receives the first reception command 105a (step S206), the first reception command 15a pass through as it is, and outputs the first reception command 105a (step S207).

According to the control signal receiving apparatus of this first embodiment as described above, there is provided an HPD detection part 114 which detects an HPD indicating that transmission of a control signal between the video audio receiving apparatus 102 and the DVD apparatus 101 is possible, and the command judging section 115 which has received the HPD detection signal 114a is operated to ignore the first reception command and make the second reception command pass through as it is. Therefore, it is possible to carry out a normal remote control operation without generating unfavorable influences on the apparatuses due to that the second reception command which goes through the CEC line through which control signals of the apparatuses are transmitted is ignored.

Embodiment 2

The control signal receiving apparatus according to a second embodiment of the present invention will provide a control signal receiving apparatus that carries out a normal remote control operation with preventing the second reception command from being ignored and without affecting unfavorable influences on the apparatuses as well as outputs the first reception command even when it received only the first reception command in a state where transmission of a control signal between the video audio receiving apparatus and the control signal receiving apparatus is possible. This can be accomplished by delaying the first reception command by a delaying section as well as making the second reception command which was inputted to the command judging section, and ignoring the first reception command which was inputted to the command judging section with being delayed by the delaying section, and further making the first reception command effective when the second reception command is not received.

Hereinafter, a control signal receiving apparatus according to the second embodiment of the present invention will be described with referring to FIGS. 4, 5, and 6. Description of similar portions as in the first embodiment are omitted and only different portions will be described.

Figure 4:
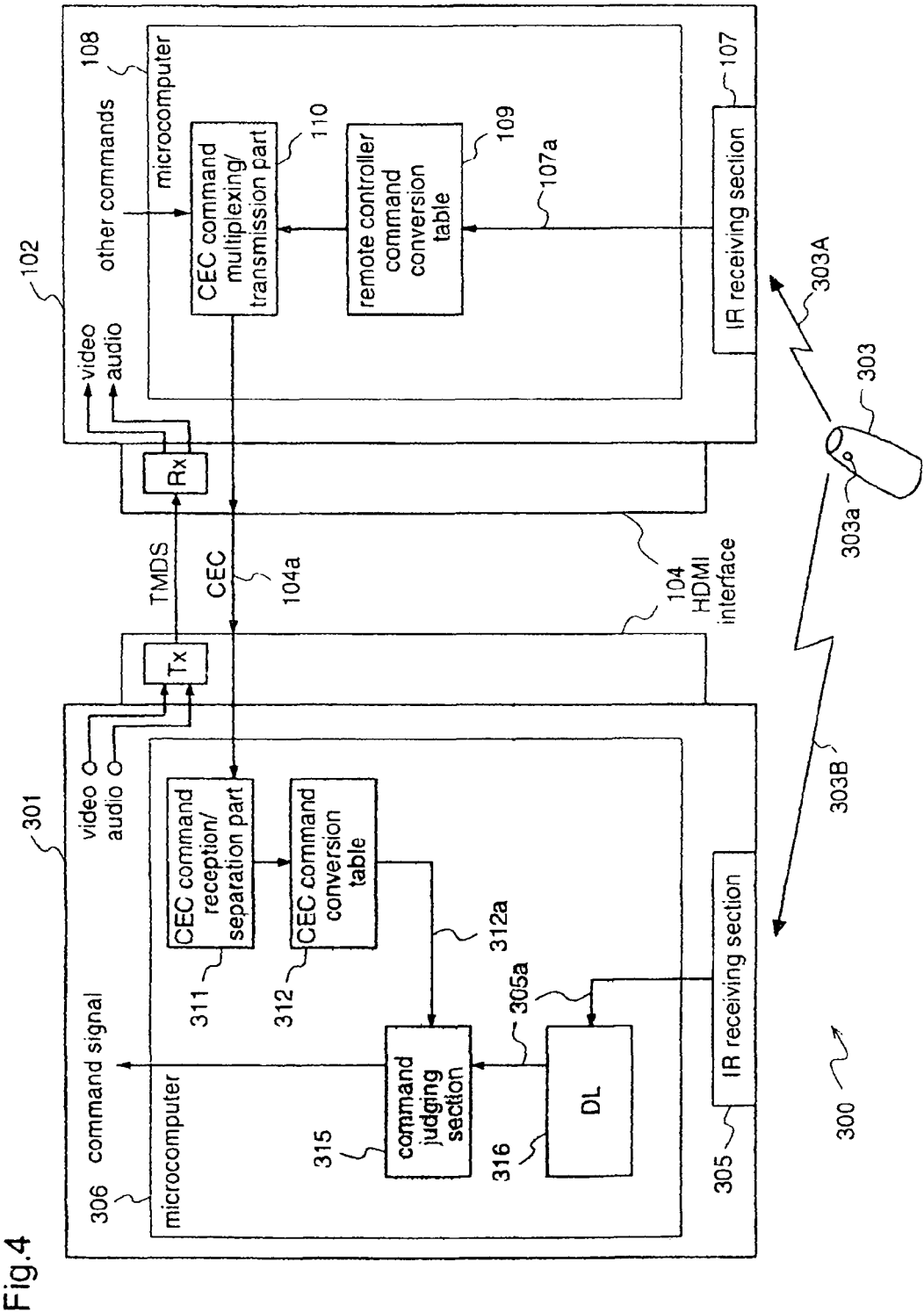
FIG. 4 is a diagram illustrating a network AV transmission system utilizing the control signal receiving apparatus according to a second embodiment of the present invention.

FIG. 4 is a diagram illustrating a construction of a network AV transmission system 300 utilizing the control signal receiving apparatus of the second embodiment of the present invention.

In the figure, the DVD apparatus 301 includes a delaying part 316 which delays the first reception command 305a by a predetermined time, and a command judging section 315 which receives the first reception command 305a which has passed through the delaying part 316 and the second reception command 312a at its inputs and judges a command which is to serve as effective and selectively output the command.

The command judging section 315 makes the second reception command 312a which is inputted to the command judging section 315 pass through as it is, and ignore the first reception command 305a which is inputted to the second judging section 315 with being delayed by the delaying part 316, when the first reception command 305a and the second reception command 312a are inputted thereto temporary close to each other. Further, the command judging section 315 makes the first reception command 305a pass through as it is, when the second reception command 312a is not inputted and the first reception command 305a which is delayed by the delaying part 316 is inputted.

Next, the command judging operation which is carried out in the network AV transmission system 300 utilizing the control signal receiving apparatus according to the second embodiment of the present invention will be described with reference to FIGS. 4, 5, and 6.

Figure 5:
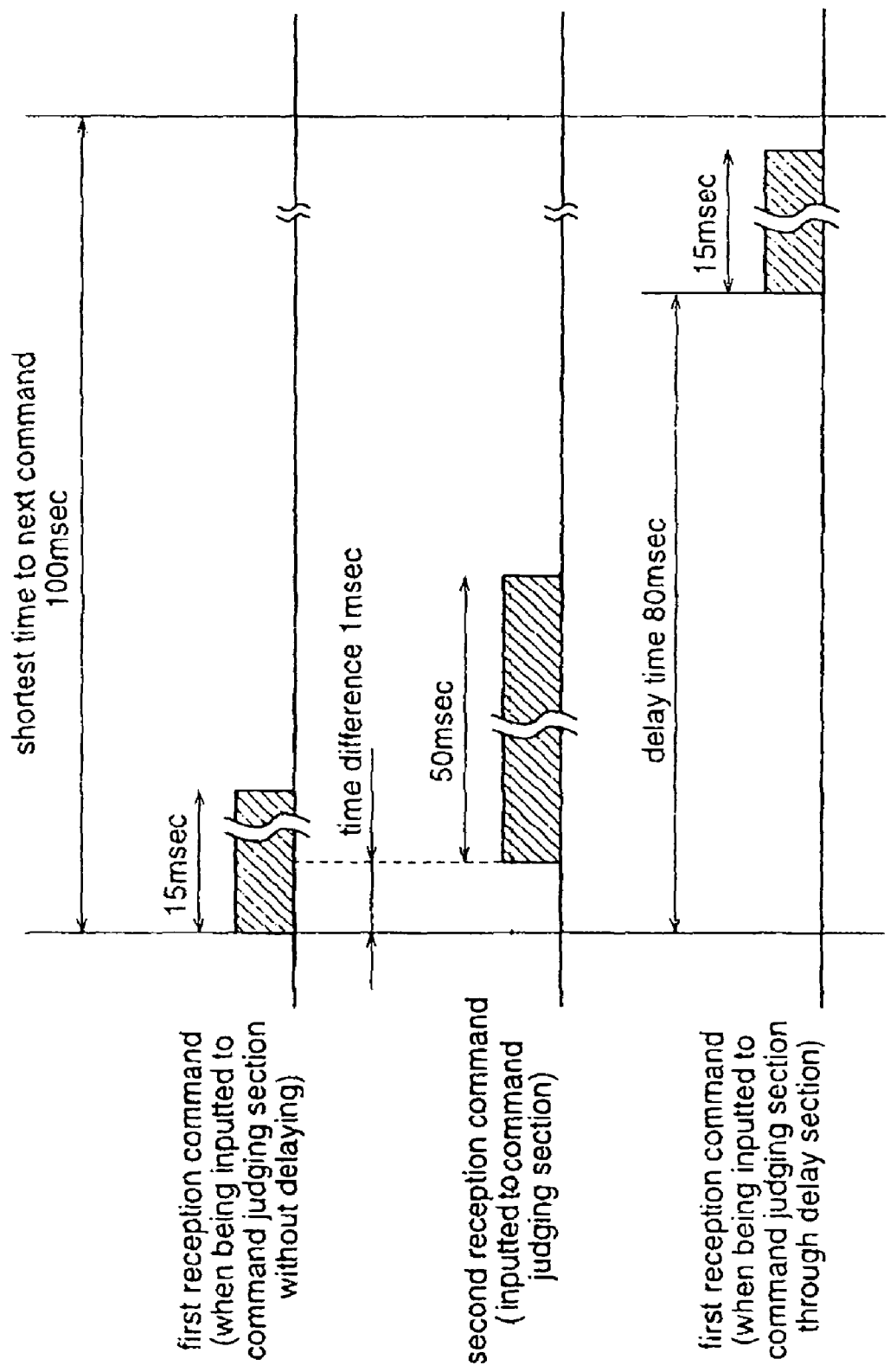
FIG. 5 is a time chart illustrating setting and canceling of ignoring for the first reception command in the command judging section in the control signal receiving apparatus of the second embodiment of the present invention.

FIG. 5 is a time chart illustrating setting and canceling of ignoring for the first reception command in the command judging section 315 in the control signal receiving apparatus of the second embodiment of the present invention.

In the figure, similarly as in the time chart shown in FIG. 2, the first reception command is made as requiring a communication time of about 15 msec, while the second reception command is made requiring a communication time of about 50 msec. Further, the command judging section 315 sets the time difference between the time when the second reception command 312a is inputted and the time when the first reception command 305a is inputted is within 1 msec.

In this case, the delay time may be made larger than or equal to 1 msec, time difference between the time when the first reception command 305a that does not pass through the delaying part 316 is inputted and the time when the second reception command 312a is inputted, and smaller than or equal to 100 msec which is the shortest time from the time when the first reception command 305a that does not pass through the delaying part 316 is inputted to the time when the another command is inputted. Besides, an example in which the delay time is made 80 msec is illustrated in the drawings.

Figure 6:
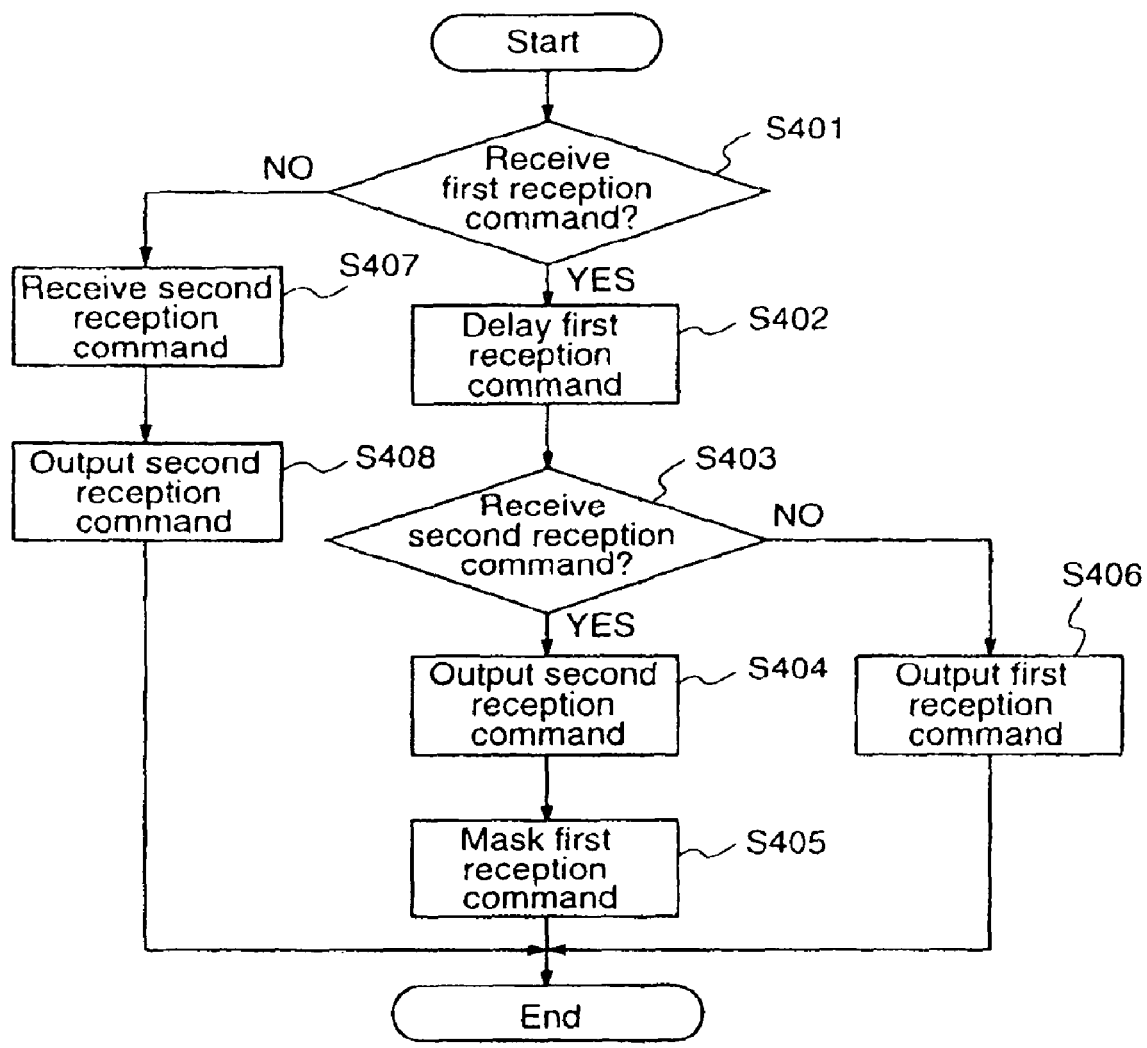
FIG. 6 is a flowchart illustrating a command judging operation in the control signal receiving apparatus of the second embodiment of the present invention.

FIG. 6 is a flowchart illustrating a command judging operation in the control signal receiving apparatus of the second embodiment of the present invention.

First of all, the DVD apparatus 301 and the video audio receiving apparatus 102 are mechanically connected to each other, and the main power supply of the both apparatuses are turned on. Then, when an operator holds the DVD remote controller 303 which is attached to the DVD apparatus 301 directed toward the video audio receiving apparatus 102 and pushes its power supply button 303a, a remote control signal 303A is emitted toward the video audio receiving apparatus 102, and the remote control signal 303A is received by the IR receiving section 107 of the video audio receiving apparatus 102. Then, its control signal 107a passes through the remote control command conversion table 109 and the CEC command multiplexing/transmission part 110, and is outputted from the video audio receiving apparatus 102 via the CEC line 104a. Then, this is received by the DVD apparatus 301, and is transmitted through the CEC command receiving/separation part 311, the CEC command conversion table to be converted to a second reception command 312a therein, to be inputted to the command judging section 315a. In the DVD remote controller 303, since an infrared is used for the remote control signal, a remote control signal 303B which is the same command as the remote control signal 303A is also emitted toward the DVD apparatus 301. Then, the remote control signal 303B is first received by the IR receiving section 305 of the DVD apparatus 301 (Step S401), and the first reception command 305a passes through the delaying part 316 to be delayed by a predetermined time so that the reception commands are inputted to the command judging section 315 in the order of the second reception command 312a and the first reception command 305a (Step S402).

Then, when while the first reception command 305a is delayed, the second reception command 312a is received (Step S403) and is inputted to the command judging section 315, and command judging section 315 makes the second reception command 312a pass through as it is, and outputs the second reception command 312a (Step S404). Then, when the first reception command which has passed through the delaying part 316 is inputted to the command judging section 315, the command judging section 315 ignores the first reception command (Step S405).

On the other hand, when, for example, the remote control signal 303A is not received by the video audio receiving apparatus 102 due to the presence of such as obstructions at operating the DVD remote controller 303 in the above step S403, the DVD apparatus 301 only receives the first reception command 305a, and the command judging section 315 makes the first reception command 305a which is inputted with delayed by the delaying part 316 pass through as it is, and outputs the first reception command 305a (Step S406).

Further, when the remote control signal 303B is not received by the DVD apparatus 301 due to the presence of such as obstructions at operating the DVD remote controller 303 in the above step S401, the DVD apparatus 301 only receives the second reception command 312a (Step S407), and the command judging section 315 makes the inputted second reception command 312a pass through as it is, and outputs the second reception command 312a (Step S408).

According to the control signal receiving apparatus of this second embodiment of the present invention, there is provided a delaying part 316 which delays the first reception command 305a which is received by the DVD apparatus 301 by a predetermined time, and the command judging section 315 makes, when the first reception command 305a and the second reception command 312a are inputted temporary close to each other, the second reception command 312a pass through as it is as well as ignores the first reception command 305a which is inputted thereto with delayed by the delaying part 316. Therefore, it is possible to provide a control signal receiving apparatus which can carry out a normal remote control operation without generating unfavorable influences on the apparatuses due to that the second reception command which goes through the CEC line through which control signals of the apparatuses are transmitted is ignored. In addition, since the first reception is made effective when the second reception command is not inputted, it is possible to normally operate the DVD apparatus 301 which is a control signal receiving apparatus even when the remote control signal is only received by the DVD apparatus 301.

Embodiment 3

The control signal receiving apparatus according to a third embodiment of the present invention has a construction in which in order to enable the first reception command be outputted without any delay in a case of only using the control signal receiving apparatus in the network AV transmission system utilizing the control signal receiving apparatus of the second embodiment, the first reception command is delayed only when the transmission of a control signal between the control signal receiving apparatus and the data receiving apparatus is possible.

The control signal receiving apparatus according to the third embodiment of the present invention will be described with reference to FIGS. 7 and 8. Description of the same reference portions in the first and the second embodiments are omitted here and only different portions will be described.

Figure 7:
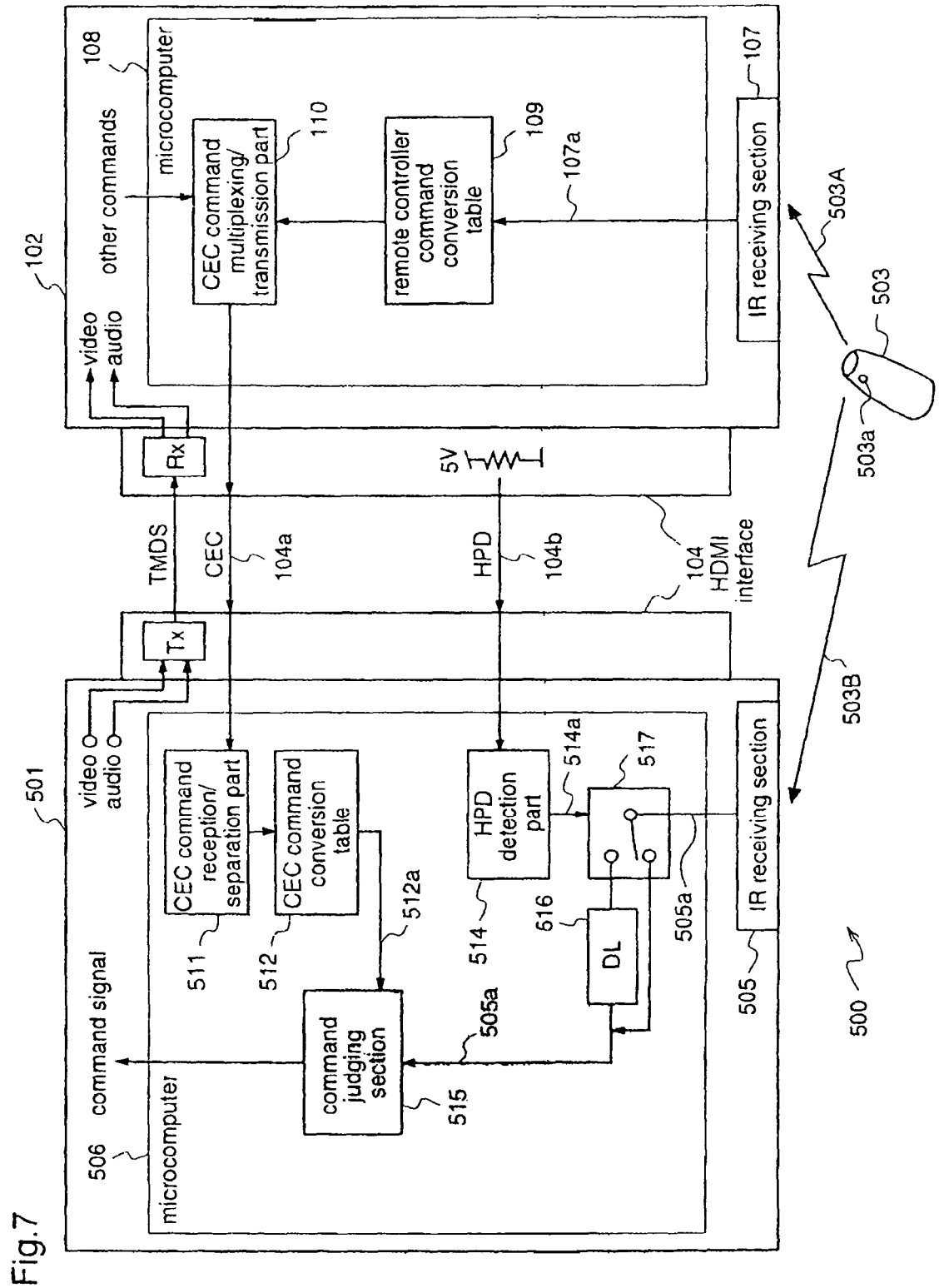
FIG. 7 is a diagram illustrating a network AV transmission system utilizing the control signal receiving apparatus according to a third embodiment of the present invention.

FIG. 7 is a diagram illustrating a construction of a network AV transmission system 500 utilizing the control signal receiving apparatus of the third embodiment of the present invention.

In the figure, the DVD apparatus 501 includes an HPD detection part 514 which detects the HPD signal 104b indicating that transmission of a control signal between the video audio receiving apparatus 102 and the DVD apparatus 501 is possible, a delaying part 516 which delays the first reception command 505a, a switching part which switches whether the first reception command 505a is delayed by the delaying part 516 or not in accordance with the presence or non-presence of the HPD detection signal 514a from the HPD detection section 514, and a command judging section 515 which receives the first reception command 505a and the second reception command 512a and judges a command which is to serve as effective and selectively outputs the command.

The command judging section 515 makes the second reception command 512a which is inputted to command judging section 515 pass through as it is as well as ignores the first reception command 505a which is inputted to the second judging section 515 with being delayed by the delaying part 516, when the HPD 104b is detected by the HPD detection part 514 and the first reception command 505a and the second reception command 512a are inputted thereto temporary close to each other. Further, the command judging section 515 makes the first reception command 505a pass through as it is, when the second reception command 512a is not inputted and the first reception command 505a is inputted thereto with being delayed by the delaying part 516.

Next, the command judging operation which is carried out in the network AV transmission system 500 utilizing the control signal receiving apparatus according to the third embodiment of the present invention will be described with reference to FIGS. 7, and 8.

Figure 8:
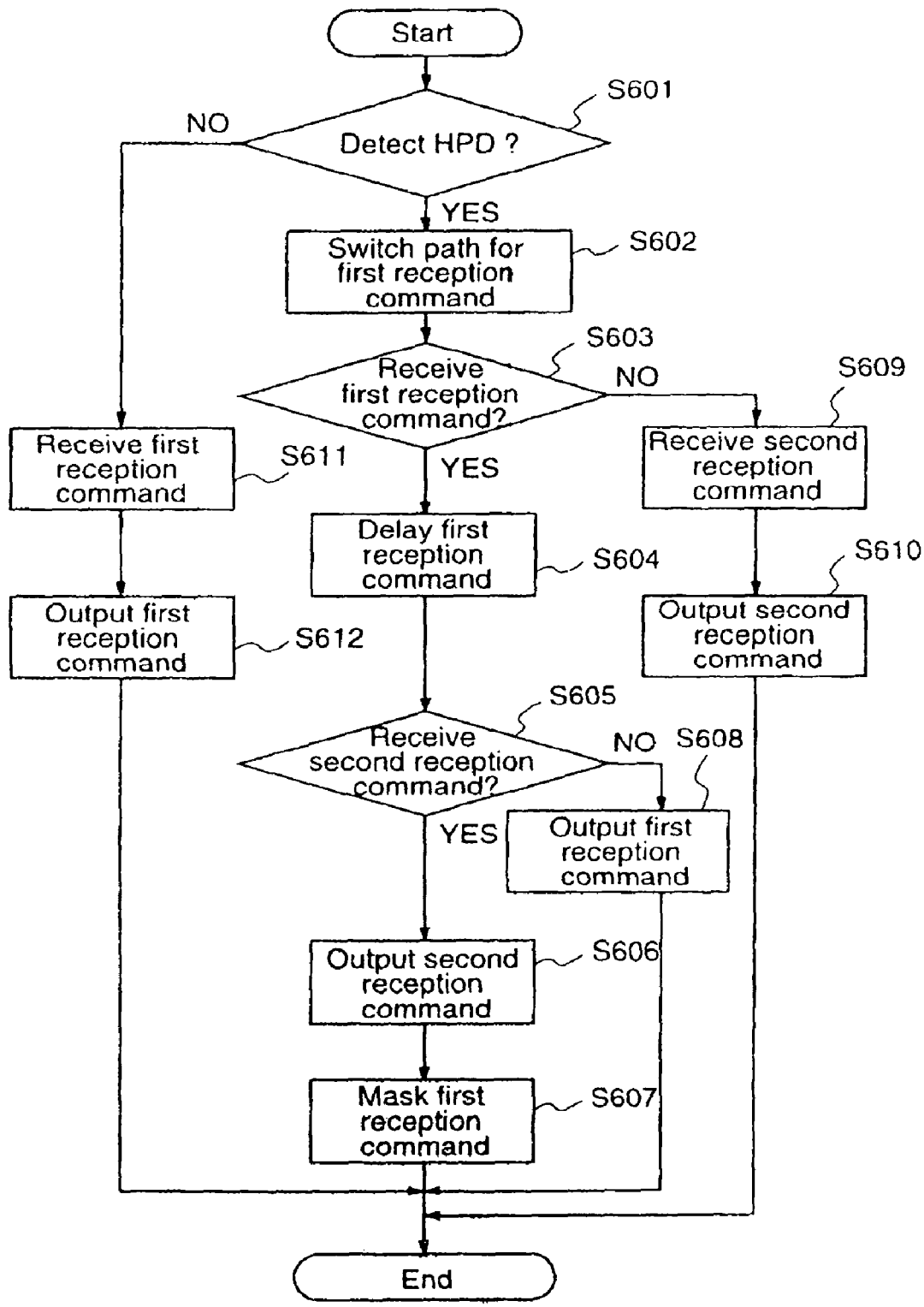
FIG. 8 is a flowchart illustrating a command judging operation in the control signal receiving apparatus of the third embodiment of the present invention.

FIG. 8 is a flowchart illustrating a command judging operation in the control signal receiving apparatus of the third embodiment of the present invention.

First of all, when the DVD apparatus 501 and the video audio receiving apparatus 102 are mechanically connected to each other, and the main power supply of the both apparatuses are turned on, the HPD signal 104b indicating the transmission of a control signal between the both apparatuses is possible is outputted and the HPD signal 104b is detected by the HPD detection signal 514 (Step S601). Next, when an operator holds the DVD remote controller 503 which is attached to the DVD apparatus 501, for example, directed toward the video audio receiving apparatus 102 and pushes its power supply button 503a, a remote control signal 503A is emitted toward the video audio receiving apparatus 102 and the remote control signal 503A is received by the IR receiving section 107 of the video audio receiving apparatus 102. Then, its control signal 107a passes through the remote control command conversion table 109 and the CEC command multiplexing/transmission part 110, and is outputted from the video audio receiving apparatus 102 via the CEC line 104a. Then, this is received by the DVD apparatus 501, and is transmitted through the CEC command receiving/separation part 511, the CEC command conversion table 512 to be converted to a second reception command 512a therein, and is inputted to the command judging section 515. In the DVD remote controller 503, since an infrared is used for the remote control signal, a remote control signal 503B which is the same command as the remote control signal 503A is also emitted toward the DVD apparatus 501. Then, the remote control signal 503B is first received by the IR receiving section 505 of the DVD apparatus 501, and the first reception command 505a is inputted to the command judging section 515.

When the HPD signal 104b is detected in step S601 as described above, the switching part 517 receives the HPD detection signal 514a and switches the switch so that the first reception command 505a passes through the delaying part 516 (Step S602). Then, when the first reception command 505a is received as described above (Step S603), the first reception command 505a passes through the delaying part 516 to be delayed by a predetermined time thereat so that the reception commands are inputted to the command judging section 515 in the order of the second reception command 512a and the first reception command 505a (Step S604).

Then, when the second reception command 512a is received (Step S605) and is inputted to the command judging section 515 as described above, the command judging section 515 makes the second reception command 512a pass through as it is, and outputs the second reception command 512a (Step S606). Then, when the first reception command 505a which has passed through the delaying part 516 is inputted to the command judging section 515, the command judging section 515 ignores the first reception command (Step S607).

On the other hand, when the remote control signal 503A is not received by the video audio receiving apparatus 102, for example, due to the presence of such a obstructions at operating the DVD remote controller 503, the DVD apparatus 501 only receives the first reception command 505a, and the command judging section 515 makes the first reception command 505a which is inputted thereto with being delayed by the delaying part 516 pass through as it is, and outputs the first reception command 505a (Step S608).

Further, when the remote control signal 503B is not received by the DVD receiving apparatus 301, for example, due to the presence of such as obstructions at operating the DVD remote controller 503 in the step S603, the DVD apparatus 501 only receives the second reception command 512a (Step S609), and the command judging section 515 makes the second reception command 512a pass through as it is, and outputs the second reception command 512a (Step S610).

While in the above third embodiment, the use of the DVD apparatus 501 and the video audio receiving apparatus 102 having an HDMI interface is described, when, for example, the HPD detection signal 514a is not detected due to such as a use of the DVD apparatus simple, or a use of the DVD apparatus 501 together with another display apparatus having no HDMI interface in the above step S601, the second reception command 512a will not be received by the DVD apparatus 501. Therefore, the command judging section 515 makes, when it receives the first reception command 505a (Step S611), makes the inputted first reception command 505a pass through as it is, and outputs the first reception command 505a (Step S612).

Further, the delay time of the delaying part 516 may be made larger than or equal to the time difference between the time when the second reception command 512a is inputted from the video audio receiving apparatus 102 via the CEC line 104a to the command judging section 515 and the time when the first reception command 505a is inputted to the command judging section 515 without passing through the delaying part 516, and smaller than or equal to the shortest time from the time when the first reception command 505a is inputted to the time when the next command is inputted.

According to the control signal receiving apparatus of this third embodiment, when the HPD signal 104b detecting the HPD indicating that transmission of a control signal between the video audio receiving apparatus 102 and the DVD apparatus 501 is possible is not detected, the first reception command 505a which is directly received from the DVD remote controller 503 is made an effective command, and when the HPD is detected, it is switched such that the first reception command 505a passes through the delaying part 516 and the command judging section 515 makes the second reception command 512a which is inputted to the command judging section 515 pass through as it is while ignores the first reception command 505a which is inputted to the command judging section 515 with being delayed by the delaying part 516. Therefore, it is possible to carry out a normal remote control operation without generating unfavorable influences on the apparatuses due to that the second reception command which goes through the CEC line through which control signals of the apparatuses are transmitted is ignored. In addition, since the first reception is made effective when the second reception command is not inputted, it is possible to normally operate the DVD apparatus 501 which is a control signal receiving apparatus even when the remote control signal is only received by the DVD apparatus 501.

Further, since while when the video audio receiving apparatus 102 is not connected to the DVD apparatus 501, and such as another display is connected to the DVD apparatus 501, no HPD 104b is detected, then the first reception command is inputted to the command judging section 515 without passing through the delaying part 516. Therefore, in such case, it is possible to carry out a remote control operation without any delay, by conducting a remote control operation only against the DVD apparatus 501.

Embodiment 4

The control signal receiving apparatus according to a fourth embodiment of the present invention provides a construction in which, in order to output commands in a correct order without ignoring the first command, when the first reception command and the second reception command which are received temporary close to each other are different commands, the coincidence of the first and the second reception command is detected, and the second reception command is made effective and the first reception command is ignored when the both reception commands coincide with each other, and the both reception commands are made effective and the first reception command is outputted first and the second reception command is outputted subsequently when the both reception commands do not coincide with each other.

Hereinafter, a control signal receiving apparatus according to a fourth embodiment of the present invention will be described with referring to FIGS. 9 and 10. Description of similar portions as in the first, second, and third embodiments are omitted and only different portions will be described.

Figure 9:
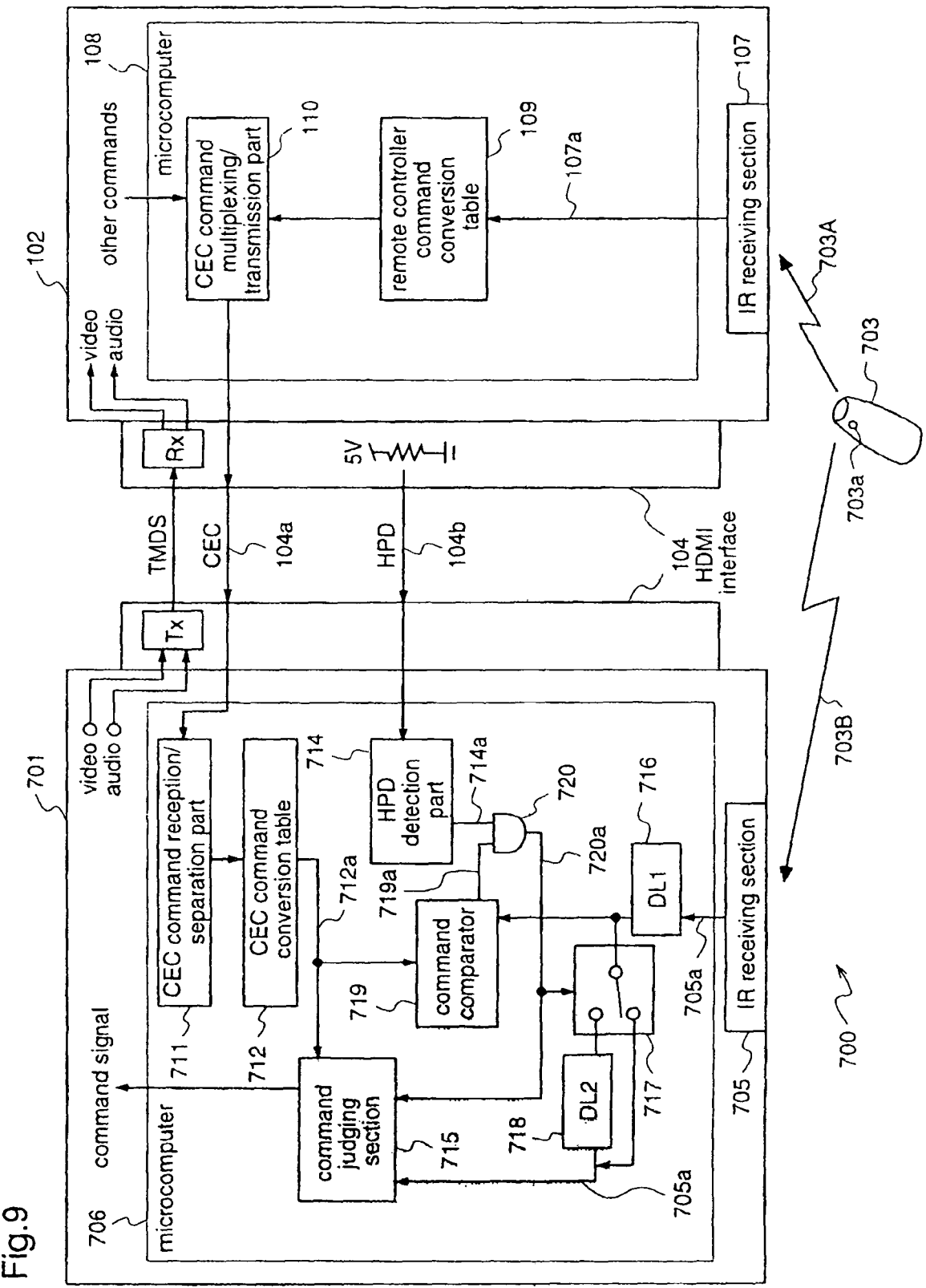
FIG. 9 is a diagram illustrating a network AV transmission system utilizing the control signal receiving apparatus of the third embodiment of the present invention.

FIG. 9 is a diagram illustrating a construction of a network AV transmission system 700 utilizing the control signal receiving apparatus of the fourth embodiment of the present invention.

In the figure, the DVD apparatus 701 includes an HPD detection part 714 which detects the HPD signal 104b indicating that transmission of a control signal between the DVD apparatus 701 and the video audio receiving apparatus 102 is possible, a command comparator 719 which detects coincidence/in-coincidence between the first reception command 705a and the second reception command 712a, an AND circuit which takes a logic AND of the output of the command comparator 719 and the output 714a of the HPD detection part 714, a first delaying part 716 for matching the inputting timings of the first reception command 705a and the second reception command 712a, a switching part 717 for switching the path for the first reception command 705a, a second delaying part 718 for delaying the first reception command 705a which is outputted from one end of the switching part 717 by a predetermined time, and a command judging section 715 which makes the second reception command effective as well as ignore the first reception command 705a when the coincidence of the first reception command 705a and the second reception command 712a is detected by the command comparator 719, while makes the both reception commands effective and outputs the first reception command 705a first and outputs the second reception command 712a subsequently.

The HPD detection part 714 outputs a signal "H" indicating the detection of HPD as the output signal 714a to the AND circuit 720 when it detected the HPD 14b. The command comparator 719 receives at its inputs the first reception command 705a and the second reception command 712a which are received temporary close to each other, and compares those input commands as to whether they coincide to each other or not. When the coincidence is detected by the command comparator 719, a signal "H" indicating the coincidence of the input commands is inputted to the AND circuit 720 as an output signal 719a. The AND circuits 720 receives the "H" outputs as the outputs of the command comparator 719 and the HPD detection part 714, and outputs, as its output 720a, the "H" signal indicating the coincidence of the first and second reception commands 705a and 712a. The switching part 717 switches, when it receives "H" from the AND circuit 720, a switch so that the first reception command 705a passes through the second delaying part 718. The command judging section 715 makes, when "H" is inputted thereto from the AND circuit 720, the inputted second reception command 712a effective and ignores the first reception command 705a which is inputted to the command judging section 715 with being delayed by the second delaying part 718.

In addition, in any case of when the in-coincidence between the first reception command 705a and the second reception command 712a is detected, when a signal HPD 104b is not detected, or when only the first reception command 705a or the second reception command 712a is received in the command comparator 719, the output 720a of the AND circuit indicates "L", and the switching part 717 switches a switch so that the first reception command 705a is inputted to the command judging section 715 without passing through the second delaying part 718.

The command judging section 715 outputs commands in according with the order of inputting as usual, when it receives "L" from the AND circuit 720, and further, when it receives the first command and the second reception command simultaneously, i.e., when the first reception command and the second reception command which are inputted temporary close to each other do not coincide with each other, it makes the both reception commands effective, and outputs the first reception command first and outputs the second reception command subsequently.

Next, the reception command judging operation which is carried out in the network AV transmission system 700 utilizing the control signal receiving apparatus according to the fourth embodiment of the present invention will be described with reference to FIGS. 9, and 10.

Figure 10:
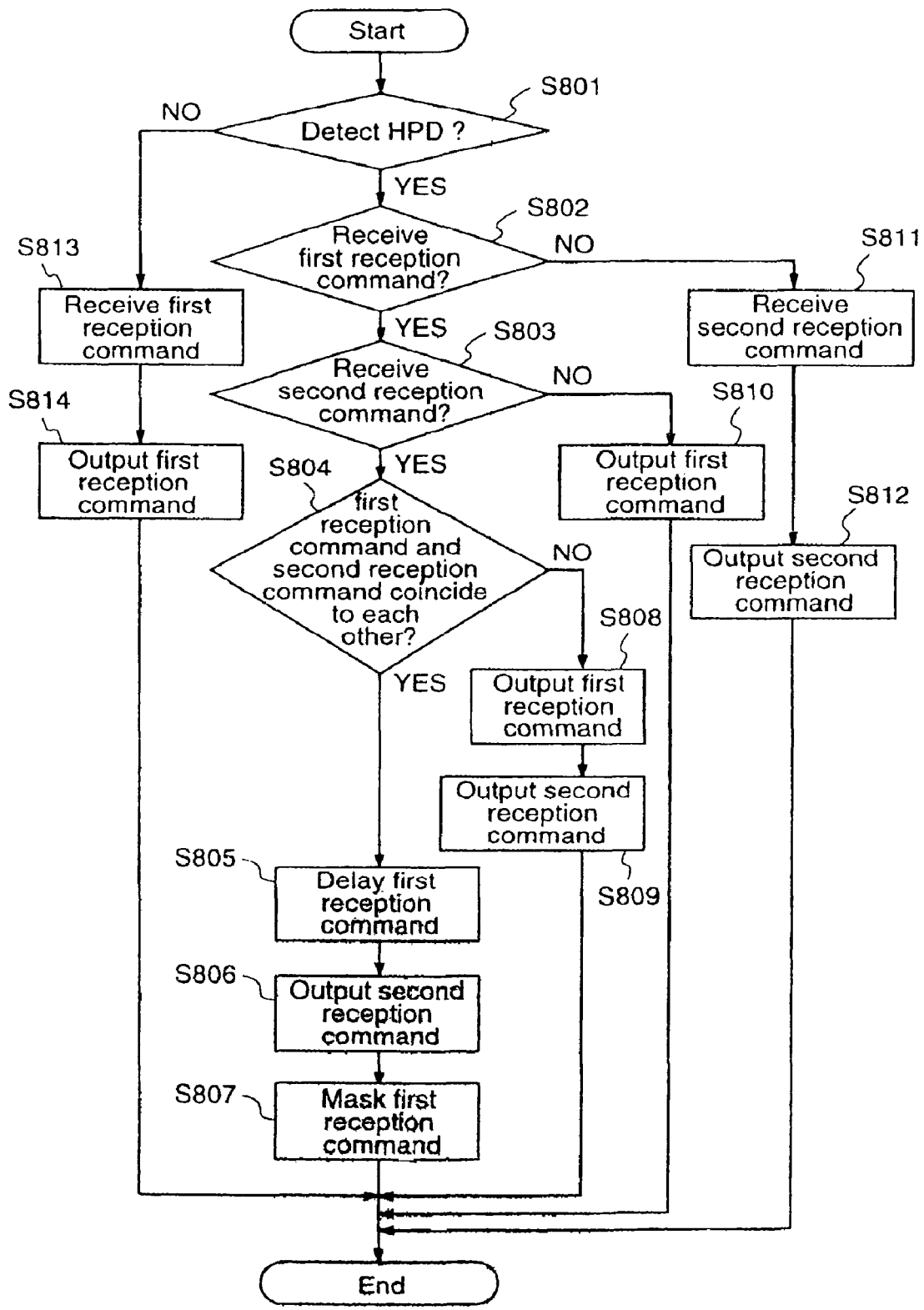
FIG. 10 is a flowchart illustrating a command judging operation in the control signal receiving apparatus of the fourth embodiment of the present invention.

FIG. 10 is a diagram illustrating a flowchart illustrating a command judging operation in the control signal receiving apparatus of the fourth embodiment of the present invention.

First of all, when the DVD apparatus 701 and the video audio receiving apparatus 102 are mechanically connected to each other, and the main power supply of the both apparatuses are turned on, an HPD signal 104b indicating that transmission of a control signal between the both apparatuses has become possible is outputted and the HPD signal 104b is detected by the HPD detection part 714 (Step S801). Next, when an operator holds the DVD remote controller 703 which is attached to the DVD apparatus 701 directed toward the video audio receiving apparatus 102 and pushes its power supply button 703a, a remote control signal 703A is received by the IR receiving section 107 of the video audio receiving apparatus 102. Then, its control signal 107a passes through the remote control command conversion table 109 and the CEC command multiplexing/transmission part 110, and is outputted from the video audio receiving apparatus 102 via the CEC signal 104a. Then, this is received by the DVD apparatus 701, and is transmitted through the CEC command receiving/separation part 711, the CEC command conversion table 712 to be converted to a second reception command 712a therein, to be inputted to the command judging section 715. In the DVD remote controller 703, since an infrared is used for the remote control signal, a remote control signal 703B is also emitted directed toward the DVD apparatus 701. Then, the remote control signal 703B is first received by the IR receiving section 705 of the DVD apparatus 701, and the first reception command 705a is inputted to the command judging section 715.

When the HPD is detected in Step S801 as described above, the first reception command 705a is received (Step S802), and the second reception command 712a is received temporary close to the first reception command 705a (Step S803), the command comparator 719 receives the first reception command 705a and the second reception command 712a, to compare the both commands as to whether they coincide to each other (Step S804). When the coincidence is detected by the command comparator 719, an "H" signal indicating the coincidence is outputted to the AND circuit 720 as its output signal 719*a*. The AND circuit 720 receives the "H" indicating the coincidence from the command comparator 719 and the "H" indicating the detection of the HPD from the HPD detection circuit, to output "H" to both of the switching part 717 and the command judging section 715. The switching part 717 which has received "H" from the AND circuit 720 switches a switch so that the first reception command 705*a* passes through the second delaying part 718, thereby to delay the first reception command 705*a* (Step S805). Then, the command judging section 715 receives the "H" signal from the AND circuit 720 and makes the inputted second reception command 712*a* as it is, thereby to output the second reception command 712*a* (Step S806), as well as ignores the first reception command 705*a* which is inputted thereto with delayed by the second delaying part 718 (Step S807).

On the other hand, in a case where the first reception command 705*a* and the second reception command 712*a* which are received temporary close to each other are commands which are different from each other in the above Step S804, the command comparator 719 detects the in-coincidence between the first reception command 705*a* and the second reception command 712*a*, to obtain the "L" output 720*a* from the AND circuit 720, and therefore, the first reception command 705*a* is made outputted to the command judging section 715 without passing through the second delaying part 718 by the switching part 717. Then, the first reception command 705*a* and the second reception command 712*a* are inputted to the command judging section 715 at simultaneously, and the command judging section 715 makes, when it receives "L" from the AND circuit 720, the both reception commands effective, and outputs the first reception command 705*a* first (Step S808) and outputs the second reception command 712*a* subsequently (Step S809).

Further, when the remote control signal 703A is not received by the video audio receiving apparatus 102, for example, due to the presence of such as obstructions at operating the DVD remote controller 703 in the above step S803, the DVD apparatus 701 only receives the first reception command 705*a*, and the command judging section 715 makes the inputted first reception command 715*a* through as it is, and outputs the first reception command 705*a* (Step S810).

Further, when the remote control signal 703B is not received by the DVD apparatus 701, for example, due to the presence of obstructions at operating the DVD remote controller 703 in the above step S802, the DVD apparatus 701 only receives the second reception signal 712*a* (Step S811), and the command judging section 715 makes the inputted second reception command 712*a* through as it is, and outputs the second reception command 712*a* (Step S812).

While in the above-described fourth embodiment, the use of the DVD apparatus 701 and the video audio receiving apparatus 102 having an HDMI interface is described, when, for example, the HPD detection signal 714*a* is not detected due to such as a use of the DVD apparatus simple, or a use of the DVD apparatus 701 together with another display apparatus having no HDMI interface in the above step S801, the second reception command 712*a* will not be received by the DVD apparatus 701. Therefore, the command judging section 715 makes, when it receives the first reception command 705*a* (Step S813), the input first reception command 705*a* pass through as it is, and outputs the first reception command 705*a* (Step S814).

According to the control signal receiving apparatus of this fourth embodiment as described above, there is provided a construction in which a command comparator 719 which detects coincidence/in-coincidence of the first reception command and the second reception command is provided, and the second reception command is made effective and the first reception command is ignored when the both commands coincide with each other, while the both reception commands are made effective and the first reception command is outputted first and the second command is outputted subsequently when the both reception commands do not coincide with each other. Therefore, even when the first reception command and the second reception command which are received temporary close to each other are different commands, it is possible to carry out a command outputting by a remote control operation in the order of reception, without ignoring the first reception command.

Here, in this fourth embodiment, the first reception command 705*a* is delayed and the second reception command 712*a* is made pass through, when the first reception command 705*a* and the second reception command 712*a* coincide with each other, and the both reception commands are outputted from the first reception command 705*a* when the command judging section received the both reception commands which are simultaneously inputted, when the both reception commands do not coincide to each other. However, it may be constructed such that the command judging section 715 is provided with a rearranging function, and the both reception commands are inputted to the command judging section 715 to carry out a rearrangement of the both reception commands to be outputted in a correct order for outputting in accordance with the detection result of coincidence/in-coincidence of the both reception commands, and then outputting or ignoring of a command is carried out.

Further, while in the above first to fourth embodiments a DVD apparatus is described, the present invention may be applied to any devices which outputs video and audio having an HDMI interface, such as a STB (Set Top Box) or a projector.

Further, in the control signal receiving apparatuses according to the first to fourth embodiments, the present invention is effective if other control signals are related to using such as open areas, even in a case where a wired or wireless LAN other than an HDMI interface is employed. In such cases, it may be constructed such that in place of detecting the HPD, such as a detection signal indicating that transmission of control signals of the control signal receiving apparatus and the data receiving apparatus is possible should be detected.

APPLICABILITY IN INDUSTRY

The control signal receiving apparatus of the present invention is useful in such as a network AV transmission system which is connected and constructed via HDMI which is a digital audio/video interface.

The invention claimed is:

1. A control signal receiving apparatus which can receive a control signal from a remote control unit both directly from the remote control and indirectly through a data receiving apparatus which is connected to the control signal receiving apparatus, comprising:

a command judging section which receives a first command, which is directly received from the remote control unit, and a second command, which is received via the data receiving apparatus, as its inputs and selectively outputs one of the first and second commands by judging which command is to serve as effective, wherein there are provided a connection signal detection section which detects a connection signal indicating that transmission between the control signal receiving apparatus and the data receiving apparatus is possible, and a delaying section which delays the first command so that the second command and the first command are inputted in this order to the command judging section, and wherein the command judging section makes the second command, which is received by the control signal receiving apparatus later, effective, when the first command and the second command are received by the control signal receiving apparatus temporally close to each other, makes the first command inputted thereto without passing through the delaying section and makes the inputted first command pass through as it is, when the connection signal is not detected by the connection signal detection section, and makes the second command which is inputted thereto prior to the first command, pass through as it is, and ignores the first command which is delayed by the delaying section to be inputted thereto later than the second command, when the connection signal is detected by the connection signal detecting section.

2. A control signal receiving apparatus as defined in claim 1, wherein, the command judging section makes the first command, which is inputted via the delaying section, pass through as it is, when the connection signal is detected by the connection signal detecting section and no second command is inputted thereto.

3. A control signal receiving apparatus as defined in claim 1, wherein, the delay amount of the first command, which is delayed by the delaying section, is larger than the time difference between the time when the first command is inputted to the command judging section without passing through the delaying section and the time when the second command is inputted to the command judging section, and is smaller than the shortest time from the time when the first command is inputted thereto up to the time when the next command is inputted thereto.

4. A control signal receiving apparatus as defined in claim 2, wherein, the delay amount of the first command, which is delayed by the delaying section, is larger than the time difference between the time when the first command is inputted to the command judging section without passing through the delaying section and the time when the second command is inputted to the command judging section, and is smaller than the shortest time from the time when the first command is inputted thereto up to the time when the next command is inputted thereto.

* * * * *